Sept. 24, 1929.  R. K. LEE  1,729,394

MOTOR MOUNTING

Filed Nov. 13, 1926

Inventor
Roger K. Lee

By Blackmore, Spencer & Hail
Attorneys

Patented Sept. 24, 1929

1,729,394

UNITED STATES PATENT OFFICE

ROGER KENNETH LEE, OF DETROIT, MICHIGAN, ASSIGNOR TO GENERAL MOTORS CORPORATION, OF DETROIT, MICHIGAN, A CORPORATION OF DELAWARE

MOTOR MOUNTING

Application filed November 13, 1926. Serial No. 148,234.

My invention relates to vibration absorbing connections, particularly automobile engine mountings and the like, and is an amplification of the construction shown in co-pending patent application Serial No. 123,107.

An object of the invention is to provide an elastic mounting which will relieve jars and strains, yet firmly position the parts, result in better motor operation and obviate wear and breakage of parts.

Figure 1:
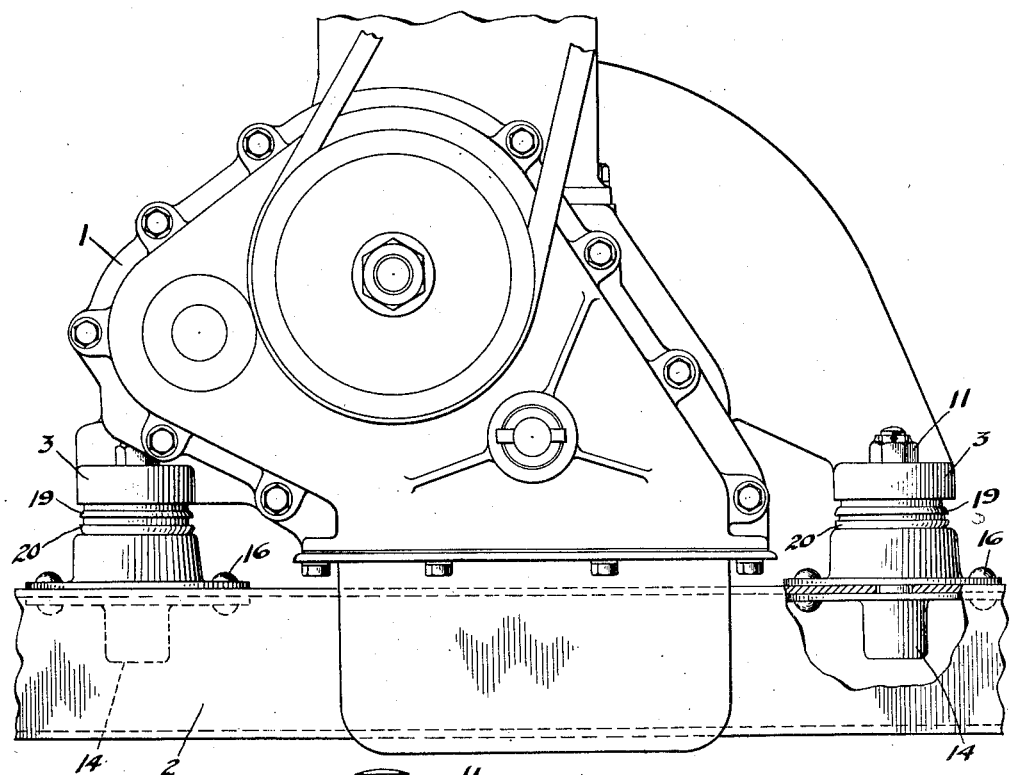

Referring to the drawing, illustrating the preferred but not necessarily the only embodiment of the invention, Figure 1 is a fragmentary front elevation of an internal engine mounted on the chassis frame of an automobile by means of the present cushioned connection.

Figure 2:
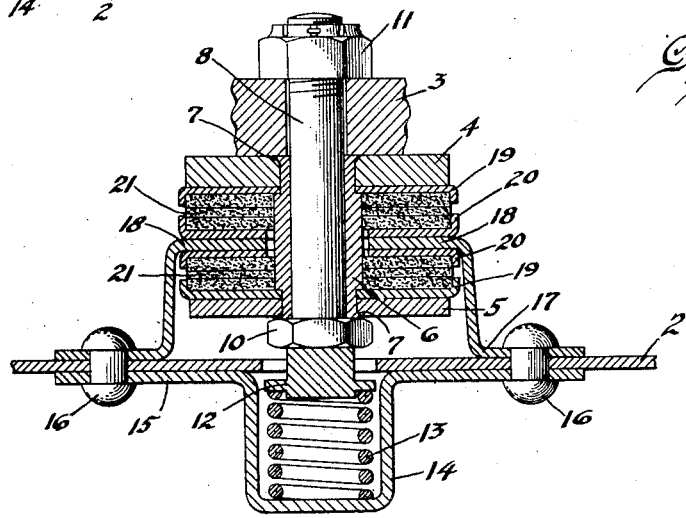

Figure 2 cross sectional view of the mounting forming the subject matter of the present invention.

An internal combustion engine is indicated by the reference character 1 as being supported upon a transverse channeled frame member 2. The motor may be suspended at three or more points as desired, but for illustrative purposes only two front suspension points are shown. Beneath the leg or arm 3 of the engine are a pair of spaced plates or discs 4 and 5 mounted upon a shouldered sleeve 6. The ends of the sleeve are swedged over as at 7 to maintain the plates in place. A stud or pin 8 extends thru the sleeve 6 and a hole in the motor arm or leg 3, having an enlarged head 10 abutting the lower plate 5 and a nut 11 screw threaded on the pin to firmly fasten the sleeve 6 and plates 4 and 5 to the motor leg. The head 10 of the stud is provided with an extension 12 projecting thru a hole in the frame and forming a seat to bear upon a compression spring 13 carried in a depression or cup 14 of a plate 15. The plate 15 is secured upon the undersurface of the frame member 2, preferably by means of rivets 16, which also secure to the top surface of the frame, a plate 17 having a raised or offset portion 18, which is located intermediate the two plates 4 and 5. For convenience and economy of manufacture the plates 15 and 17 may be stamped from sheet metal.

Located between the opposite sides of the raised portion 18 and each of the spaced plates 4 and 5 are positioned a pair of oppositely disposed cups 19 and 20. Each cup 19, may if desired, be firmly held against the respective plates 4 and 5 by being positioned between the plate and the shoulder of the sleeve 6. The opposing cups 20 are preferably welded or otherwise secured to the tops and bottom of the offset portion 18, and the central opening thru the cups and offset portion is made of slightly larger diameter than the sleeve 6, providing ample clearance to permit relative axial movement and at the same time obviate metallic contact. Within each pair of cups is a flexible material 21, preferably consisting of an intermediate rubber or other compressible strip and fabric strips on each side of the rubber, the strips being vulcanized together. The integral flexible strips thus have a small degree of compressibility, due to the presence of the single rubber strip, while the outside fabric strips give strength and body to the rubber, afford wear resistant contact surfaces and add to the life of the rubber.

The tension of the spring 13 is such that the engine is floatingly suspended. When the engine is not in operation the relation of the parts is as shown in Figure 2. At such time the spring 13 exerting its force against the bottom of the pin carries the entire gravity weight of the engine. The raised frame portion 18 is in the exact center or midway between the spaced plates 4 and 5. The flexible material 21 within the cups, is then relieved of any weight and free of compression.

Vibrations caused by the internal movements of the parts of a motor are very slight, amounting to but three or four thousandths of an inch. This small vibration, when constant, as when the engine is being operated, is quite damaging to the motor and frame, detracts from the efficiency of the engine and the pleasure of the automobile passengers. The present mounting, cushions or absorbs such vibrations and obviates the disadvantage of a rigid connection. The vibrating movement of the floating engine results in a relative to and fro movement of the plates carried by the engine, with the raised surface 18 fixed on the frame. The downward vibratory motion presses the upper pair of oppositely disposed cups 19 and 20 toward each other between the plate 4 and raised portion 18, while the upward vibratory motion presses the lower pair of cups 19 and 20 toward each other between the plate 5 and raised portion 18. The rubber in each instance is thus compressed to cushion and yieldingly resist such small vibratory movements.

Inasmuch as the flexible cushion 21 has but a small degree of compressibility, only slight vibrations are cushioned. It will be obvious that after the elastic limit is reached, the cushioning action ceases. In other words, slight movements are absorbed quite freely, but the mounting becomes rigidly resistant to torque reactions and other unusual vibrations of large amplitude.

Other forms of cushioning element may be employed, as for instance, small helical springs with stops to limit deflection.

While the invention has been shown and described as an engine mounting, it is equally useable in other connections such as spring shackles, automobile body supports and the like. The parts and arrangement have been described more or less specifically but obvious modifications may be made as come within the scope of the appended claims.

I claim:

1. In a device of the character described, the combination with a support and a body to be supported, of a yielding member carrying the weight of the body, but permitting relative movement of the support and body upon vibration, a pair of plates, a mounting maintaining the plates in spaced relation, means to anchor said mounting to the body, a portion of the support extending intermediate the plates, and vibration absorbing elements between the support portion and the respective plates.

2. A vibration absorbing mounting for engines and the like, including a raised portion carried by the supporting frame, a pair of spaced plates carried by the engine and located on opposite sides of the raised portion, elastic members disposed between the respective plates and raised portion adapted to be compressed to cushion the vibratory movements, and means to yieldingly suspend the engine to free the elastic members of the engine weight.

3. A vibration absorbing mounting, including a raised portion carried by the supporting frame, a pair of spaced plates carried by the body to be supported, located on opposite sides of the raised portion, elastic members having a limited degree of compression disposed between the respective plates and raised portion and adapted to be compressed to cushion slight vibratory movements, and rigidly resist vibrations of high amplitude, and tension means yieldingly suspending the body and tending to relieve the elastic member of compression.

4. A vibration absorbing mounting including an offset portion carried by the supporting frame, cushioning elements disposed upon the opposite sides of said offset portion, oppositely disposed retaining cups therefor, members abutting the cushioning elements and carried by the body to be supported whereby the vibratory movements of the body relative to the frame, compresses the cushion material and means floatingly bearing the weight of the body.

5. A vibration absorbing mounting, including a portion carried by the supporting frame, cushioning elements disposed on opposite sides of said portion carried by the supported body and adapted to be compressed upon the vibratory movement of such body to absorb such movement and yielding means floatingly and normally carrying the entire weight of the supported body and tending to maintain the cushioning elements free of compression.

6. In a device of the character described, the combination with a support and body to be supported, of a vibration absorbing element, seats for the vibration absorbing element, one of which is carried by the support and the other by the body, a mounting for the last mentioned seat, an attachment member anchoring the mounting to the body, and a yielding tensioned element interposed between the support and the attachment member to yieldingly support the entire weight of the body independently of said vibration absorbing element.

7. In a device of the character described, the combination with a supporting frame, and a body to be supported thereon, of a depressed cup carried by the frame, a dependent pin projecting from the body into said cup, a spring within the cup exerting its tension upon the pin to yieldingly support the body, and resilient means between the frame and body to limit and cushion relative movement between the frame and body.

8. In a device of the character described, the combination with a supporting frame, and a body to be supported thereon, a dependent pin projecting from said body, a tension spring mounted on the frame on which the pin rests, whereby the weight of the body is yieldingly suspended, and vibration absorbing means carried by the pin in engagement with the frame.

9. In a device of the character described, the combination with a supporting frame, and a body to be supported, of a yielding resistance element mounted on the frame, a dependent member carried by the body and resting on said yielding resistance element to floatingly bear the weight of the supported body, elastic cushioning means carried by the dependent member on opposite sides of the frame, and seats therefor on the frame and body respectively, between which seats, compression of the cushioning means is effected to absorb vibration.

10. In a device of the character described, the combination with a supporting frame, and a body to be supported, of a yielding resistance element mounted on the frame a dependent member carried by the body, and resting on said yielding resistance element to floatingly bear the weight of the supported body, a pair of spaced plates, a mounting for the plates fastened to the dependent member, a portion fixed to the supporting frame, and resilient material between the fixed frame portion and the spaced plates, adapted to resist the vibratory movement of the floating body.

11. In a device of the character described, the combination with a supporting frame, an engine to be mounted, of a raised portion on the upper surface of the frame, a dependent portion on the engine including a pair of plates one on each side of said raised portion, a hollow spacer sleeve for the plates, and a stud extending thru the hollow sleeve fastening the plates to the engine, cushioning elements interposed between the plates and the raised frame portion to free the frame of engine vibration, a depressed cup on the lower surface of the frame and a tensioned spring seating in said cup and bearing on the bottom of said stud to floatingly carry the engine weight.

12. In a device of the character described, the combination with a supporting frame, an engine to be mounted upon said frame, of a raised portion on the frame, a dependent portion on the engine including a pair of plates, one on each side of said raised portion, a hollow sleeve to maintain the plates in predetermined spaced relation and a stud extending thru the hollow sleeve having anchoring engagement with the engine, of a pair of oppositely disposed retaining cups located between the raised frame portion and one of the plates and a similar pair of retaining cups between the raised frame portion and the other of the plates, integrally united rubber and fabric carried in the said retaining cups adapted to cushion engine vibration by the compression of the rubber upon the relative movement of the plates and raised portion, of a depressed cup carried by the frame and a tensioned spring seating in the cup and exerting its tension upwardly upon the bottom of said stud to yieldingly support the engine weight.

13. A device of the character described comprising two members, one of which is supported by the other, a cushion element interposed therebetween, said element comprising a thin rubber sheet and fabric facings therefor bonded throughout to the faces thereof to confine the rubber whereby short vibrations of the supported member are absorbed.

14. A device of the character described comprising a frame member of a vehicle, a heavy member carried thereby and subject to short vibrations, a thin cushion element interposed between said members and comprising a thin intermediate strip of rubber and strips of fabric vulcanized to the faces of said rubber strip to confine the latter whereby short vibrations of the second mentioned member are absorbed.

15. In combination, a supporting frame, a body to be supported thereon, means to float the gravity weight of the body on the frame, a series of plates arranged in alternate relation and carried by the frame and body respectively, and relatively thin pads of elastic material capable of a comparatively small degree of deformation interposed between the plates to cushion vibrations of small amplitude.

16. In combination, a frame, an engine, means to float the gravity load of the engine on the frame, and a pair of vibration cushions disposed between portions of the engine and frame, each cushion comprising a comparatively thin disc of rubber and a backing disc therefor, said cushion offering a cushioning resistance to the inherent engine vibrations of an amplitude of a few thousanths of an inch by reason of the deformation of the rubber, and being rigidly resistant to vibrations of large amplitude after the limit of deformation is reached.

17. The combination with a supporting frame and a body to be supported, of means to damp body vibration including a hollow spacer sleeve, a pair of plates fixed on said sleeve in spaced apart relation, a frame portion positioned intermediate said plates, elastic cushioning material on opposite sides of said frame portion and between the plates, a fastening pin projecting thru the sleeve for attachment with said body, and means to float the gravity load of the body and maintain the elastic material free from deformation under body weight.

18. The structure of claim 17 wherein said load floating means consists of a tensioned spring interposed between the end of the pin and the frame.

In testimony whereof I affix my signature.
ROGER KENNETH LEE.